(12) United States Patent
Fraker (10) Patent No.: US 10,507,777 B1
(45) Date of Patent: Dec. 17, 2019

(54) SNOWMOBILE LIFT APPARATUS

(71) Applicant: Randall Vincent Fraker, Seattle, WA (US)

(72) Inventor: Randall Vincent Fraker, Seattle, WA (US)

( * ) Notice: Subject to any disclaimer, the term of this patent is extended or adjusted under 35 U.S.C. 154(b) by 0 days.

(21) Appl. No.: 15/990,402

(22) Filed: May 25, 2018

(51) Int. Cl.
| | |
|---|---|
| *B60R 19/48* | (2006.01) |
| *B62J 27/00* | (2006.01) |
| *B60R 19/38* | (2006.01) |
| *B60R 19/02* | (2006.01) |
| *B62M 27/00* | (2006.01) |

(52) U.S. Cl.
CPC ............ *B60R 19/48* (2013.01); *B60R 19/023* (2013.01); *B60R 19/38* (2013.01); *B62J 27/00* (2013.01); *B62M 27/00* (2013.01)

(58) Field of Classification Search
CPC ....... B60R 19/023; B60R 19/38; B60R 19/40; B60R 19/48; B62J 27/00; B62J 2099/0053; B62M 27/00; B65G 7/12
USPC .................................... 294/15; 293/118, 119
See application file for complete search history.

(56) References Cited

U.S. PATENT DOCUMENTS

| | | | | |
|---|---|---|---|---|
| 3,785,541 A * | 1/1974 | Sibley | ...................... | B60R 9/06 180/182 |
| 3,785,688 A * | 1/1974 | Sibley | ..................... | B60R 19/02 180/182 |
| 5,697,597 A | 12/1997 | Goodbold | | |
| 5,799,976 A * | 9/1998 | Tischer | ................... | B62B 17/00 180/190 |
| 5,806,837 A | 9/1998 | Cargill et al. | | |
| 6,874,762 B2 * | 4/2005 | Leitner | .................... | B62H 1/00 254/131 |
| 6,971,465 B1 * | 12/2005 | Veara | ....................... | B62H 1/04 180/190 |
| 2016/0244012 A1 * | 8/2016 | Bilodeau | ................ | B60R 19/40 |

OTHER PUBLICATIONS

"Skidoo extended bumper lift," Dec. 21, 2014, <https://www.youtube.com/embed/I6xHTtjpTCs> [retrieved May 25, 2018] 1-page screenshot.

* cited by examiner

*Primary Examiner* — Dean J Kramer
(74) *Attorney, Agent, or Firm* — Davis Wright Tremaine LLP; Heather M. Colburn (57) ABSTRACT

A lift apparatus for a snowmobile and a kit for constructing same. The lift apparatus includes a rear bumper and first and second slides attachable to a tunnel of the snowmobile. The rear bumper includes a transverse bumper portion connected to first and second slide members. The first and second slide members are slidable along the first and second slides, respectively, to position the transverse bumper portion in a riding position or a deployed position. The transverse bumper portion is positioned farther from the snowmobile when the transverse bumper portion is in the deployed position than when it is in the riding position. The transverse bumper portion is configured to be gripped and lifted by a user when the transverse bumper portion is in the deployed position. The rear bumper is configured to lift a rear portion of the snowmobile when the transverse bumper portion is lifted.

23 Claims, 8 Drawing Sheets

SNOWMOBILE LIFT APPARATUS

BACKGROUND OF THE INVENTION

Field of the Invention

The present invention is directed generally to a device configured to lift a snowmobile.

Description of the Related Art

A snowmobile may become stuck when operated in varying weather conditions and/or over varying terrain. When this occurs, the snowmobile loses momentum and its tracks spin. The spinning tracks dig a trench and fill the snowmobile's suspension with snow, which increases the weight (e.g., approximately 100 lbs.) of the rear of the snowmobile. A user may free the snowmobile by grabbing the snowmobile's rear bumper, lifting the rear of the snowmobile by its rear bumper, and repositioning the tracks outside of the trench. Unfortunately, lifting the rear of the snowmobile requires a significant amount of effort and may be difficult, if not impossible, for some people. This problem is further exacerbated by the fact that a series of lifts may be required to reposition the tracks.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
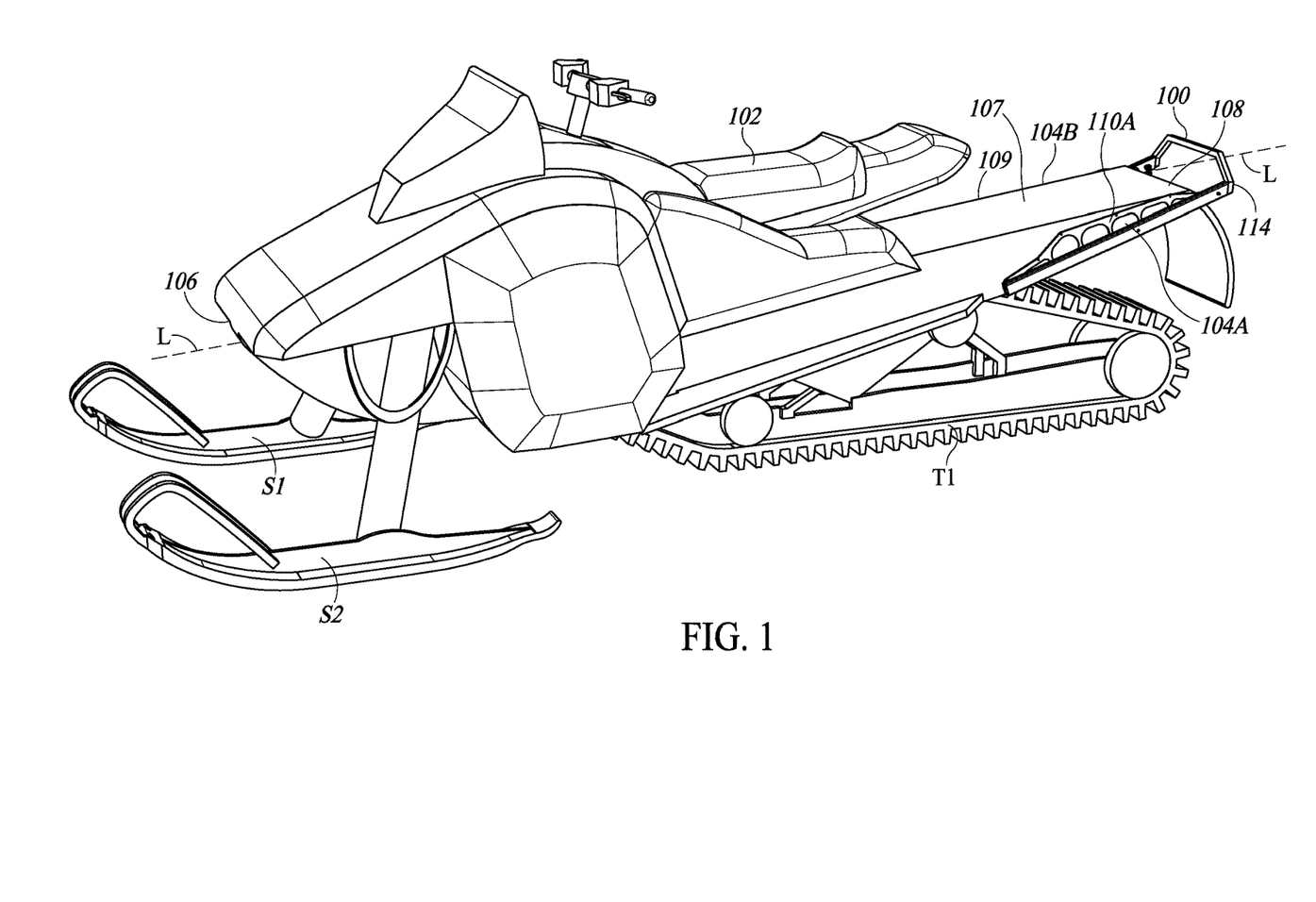
FIG. 1 is a perspective view of a lift apparatus installed on a snowmobile.

FIG. 1 illustrates a lift apparatus 100 installed on a snowmobile 102. The snowmobile 102 may be implemented as a conventional snowmobile having a pair of skis S1 and S2 and tracks T1 that propel the snowmobile 102 through snow 103 (see FIGS. 6-8). The snowmobile 102 has a first side 104A opposite a second side 104*b* and a front portion 106 opposite a rear portion 108. The snowmobile 102 has a longitudinal axis L that extends from the front portion 106 to the rear portion 108. The skis S1 and S2 are located in the front portion 106 and the tracks T1 are located in the rear portion 108. The snowmobile 102 has a tunnel 109 positioned above and spaced apart from the tracks T1. The tunnel 109 extends from the rear portion 108 at least partway toward the front portion 106. In the embodiment illustrated, the tunnel 109 has an angled upper surface 107 that is higher at the rear portion 108.

Figure 2:
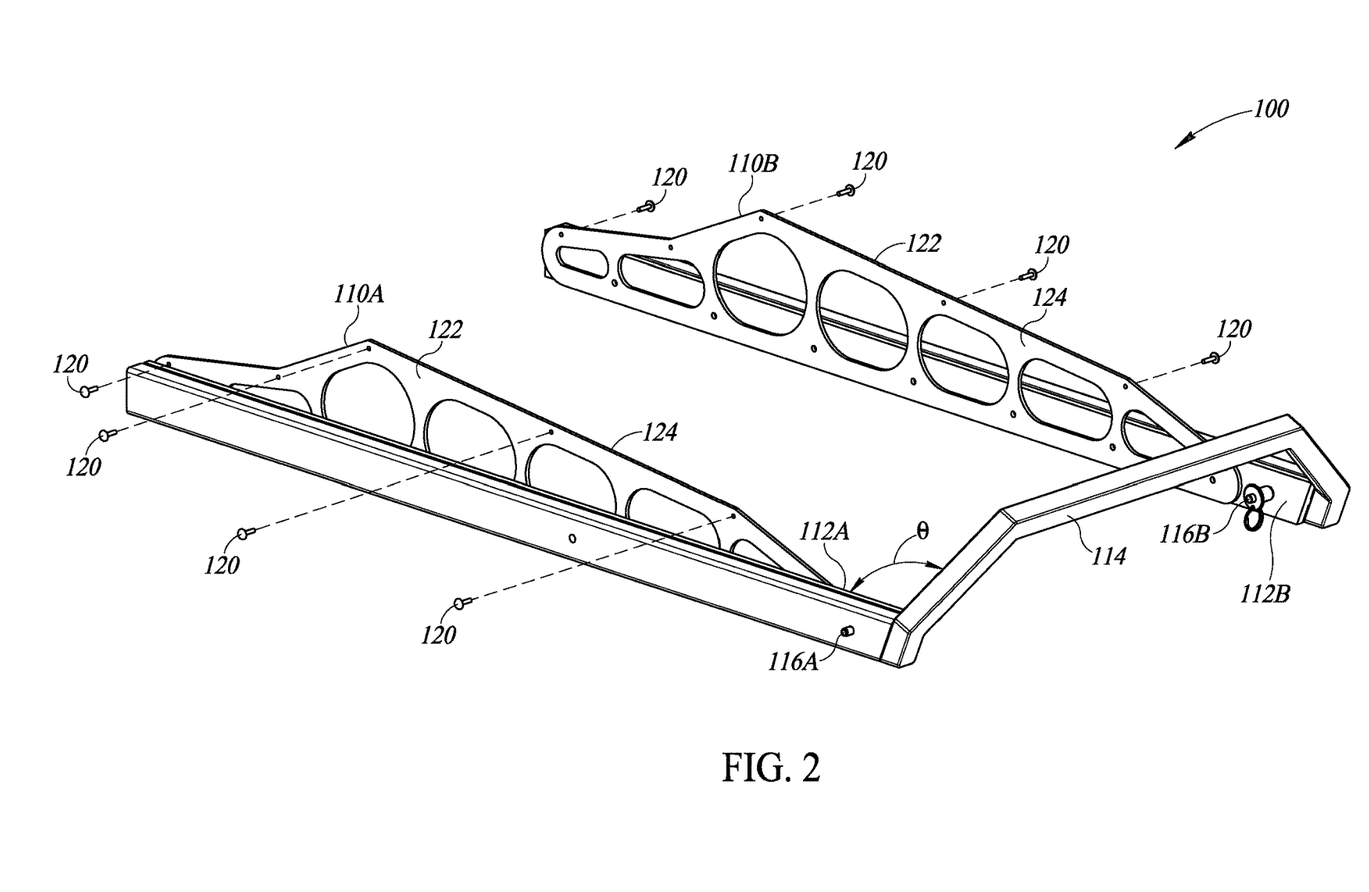
FIG. 2 is a rear perspective view of a first side of the lift apparatus with its rear bumper positioned in a first riding position.

Referring to FIG. 2, the lift apparatus 100 includes tunnel stiffeners 110A and 110*b*, slides 112A and 112*b*, a rear bumper 114, and locating pins 116A and 116B. The tunnel stiffeners 110A and 110B are substantially identical to one another. The tunnel stiffeners 110A and 110B are each elongated and may extend in a direction parallel with the longitudinal axis L (see FIG. 1) of the snowmobile 102 (see FIGS. 1 and 6-8). The tunnel stiffeners 110A and 110B may be generally planar with a planar outwardly facing side 122 opposite a planar inwardly facing side 124. Referring to FIG. 1, the inwardly facing sides 124 (see FIG. 2) of the tunnel stiffeners 110A and 110B (see FIGS. 2, 4, and 5) are configured to be mounted on the first and second sides 104A and 104B, respectively, in the rear portion 108 of the snowmobile 102. The tunnel stiffeners 110A and 110B may be mounted to the tunnel 109 along the first and second sides 104A and 104B, respectively, of the snowmobile 102. Each of the tunnel stiffeners 110A and 110B may help stiffen the tunnel 109. By way of a non-limiting example, referring to FIG. 2, the tunnel stiffeners 110A and 110B may be mounted to the tunnel 109 (see FIGS. 1 and 6-8) by a plurality of fasteners 120 (e.g., screws, bolts, and the like).

Figure 3:
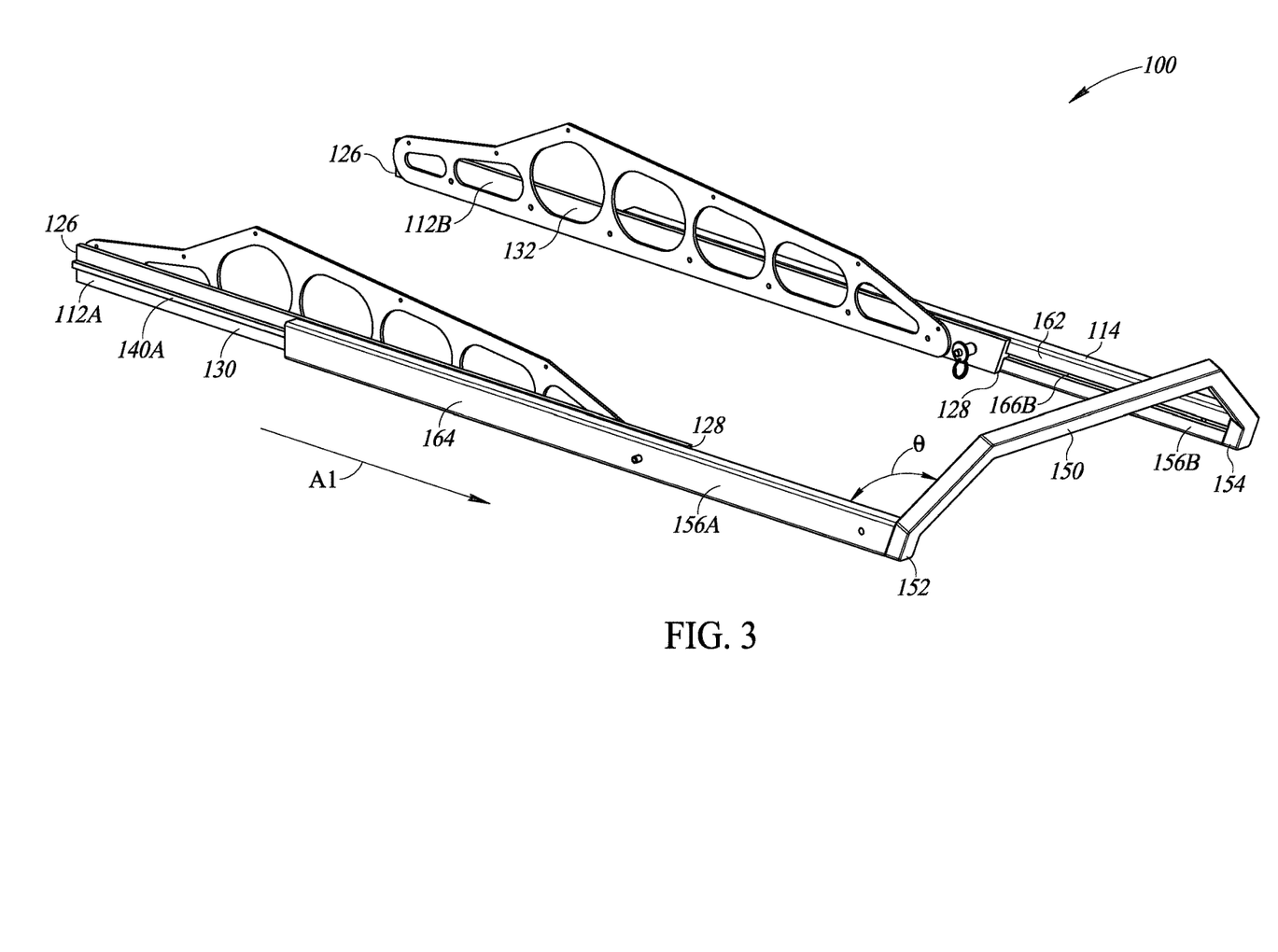
FIG. 3 is a rear perspective view of the first side of the lift apparatus with its rear bumper positioned in a second deployed position.
Figure 4:
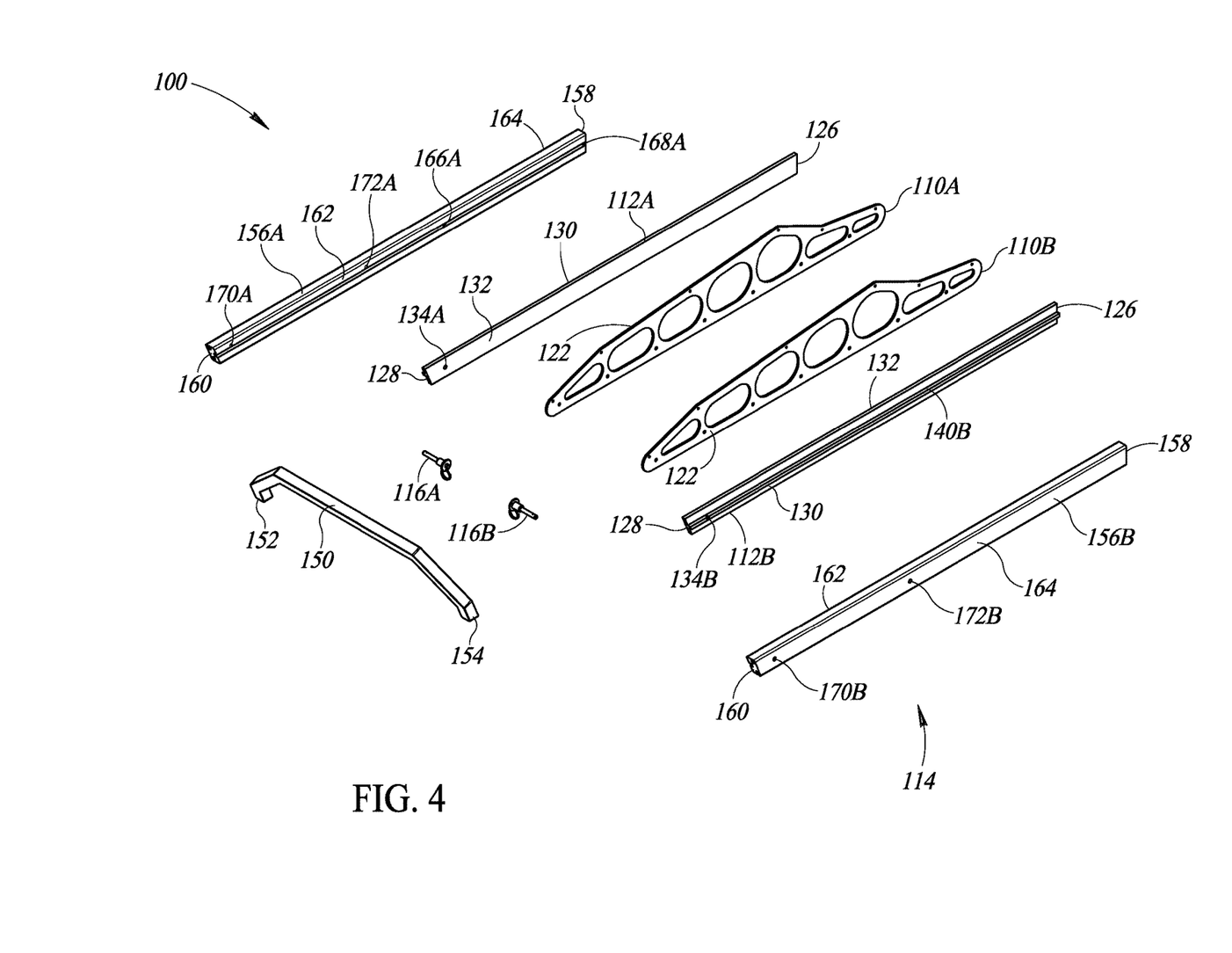
FIG. 4 is an exploded perspective view of a second side of the lift apparatus.

The slides 112A and 112B are substantially identical to one another. Referring to FIG. 3, the slides 112A and 112B are each elongated and each has a forward portion 126 opposite a rear portion 128. Referring to FIGS. 3 and 4, the slides 112A and 112B each have an outwardly facing surface 130 opposite an inwardly facing surface 132. Referring to FIG. 4, the rear portion 128 of the slide 112A includes a through-hole 134A and the rear portion 128 of the slide 112B includes a through-hole 134B. The through-holes 134A and 134B are configured to receive the locating pins 116A and 116B, respectively.

The inwardly facing surfaces 132 of the slides 112A and 112B are mounted on the outwardly facing sides 122 of the tunnel stiffeners 110A and 110B, respectively. Thus, the slides 112A and 112B may extend in a direction parallel with the longitudinal axis L (see FIG. 1) of the snowmobile 102 (see FIGS. 1 and 6-8). By way of a non-limiting example, the slides 112A and 112B may be adhered or fastened (e.g., by fasteners like the fasteners 120 illustrated in FIG. 2) to the tunnel stiffeners 110A and 110B, respectively. In the embodiment illustrated, the rear portion 128 of the slides 112A and 112B extends farther rearwardly than the tunnel stiffeners 110A and 110B.

Figure 5:
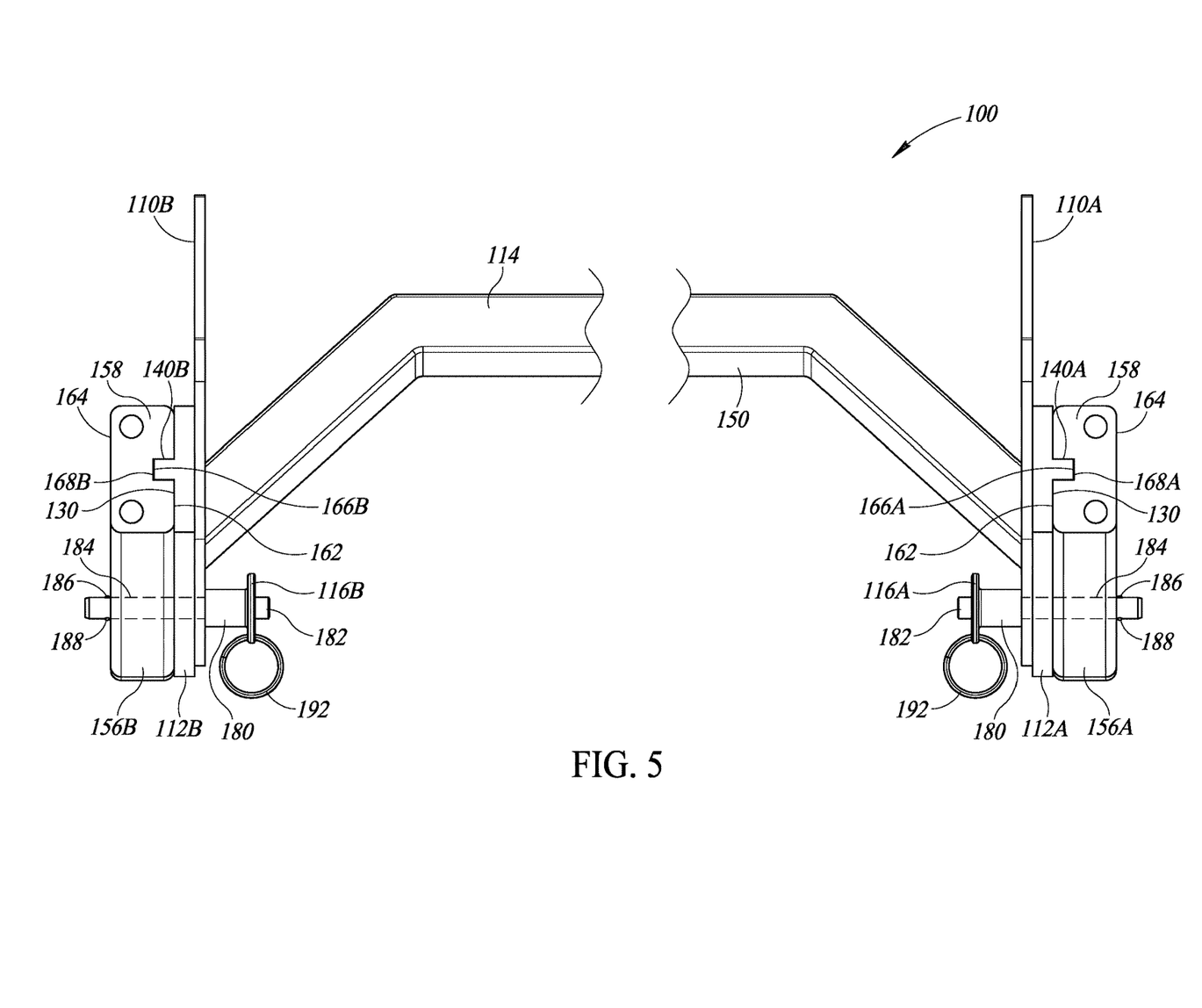
FIG. 5 is a front perspective view of the lift apparatus from below the lift apparatus.

Referring to FIG. 3, the slides 112A and 112B are configured to allow the rear bumper 114 to slide longitudinally along their outwardly facing surfaces 130 along both a first deployment direction (identified by an arrow A1) and a second riding direction opposite the first deployment direction. Referring to FIG. 5, in the embodiment illustrated, the outwardly facing surfaces 130 of the slides 112A and 112B include outwardly extending rails 140A and 140B, respectively. The rails 140A and 140B are substantially parallel with one another and may extend along the longitudinal axis L (see FIG. 1). By way of a non-limiting example, the slides 112A and 112B may each have a length of about 33 inches and a thickness of about 0.24 inches. By way of another non-limiting example, the slides 112A and 112B may each be constructed from nylon or a similar material.

Referring to FIG. 4, the rear bumper 114 includes a handle or bumper portion 150 having a first end 152 opposite a second end 154. The first end 152 is connected to a forwardly extending first slide member 156A and the second end 154 is connected to a forwardly extending second slide member 156B. The bumper portion 150 extends transversely between the first and second slide members 156A and 156B. By way of a non-limiting example, the bumper portion 150 may extend rearwardly from the first and second slide members 156A and 156B at an angle θ (see FIGS. 2 and 3) of about 112.5 degrees. The bumper portion 150 may have a height of about 4.971 inches. The bumper portion 150 may extend laterally about 19 inches. The bumper portion 150 may have a thickness of about 0.75 inches.

The first and second slide members 156A and 156B are substantially identical to one another and configured to be positioned substantially parallel with one another. The first and second slide members 156A and 156B are each elongated and each has a forward edge 158 opposite a rear edge 160. The first and second slide members 156A and 156B each have an inwardly facing side 162 opposite an outwardly facing side 164. Referring to FIG. 5, the inwardly facing side 162 of the first slide member 156A includes an open channel 166A having an opening 168A formed in the forward edge 158 of the first slide member 156A. The opening 168A is configured to receive the rail 140A, which slides freely within the channel 166A. Similarly, the inwardly facing side 162 of the second slide member 156B includes a channel 166B having an opening 168B formed in the forward edge 158 of the second slide member 156B. The opening 168B is configured to receive the rail 140B, which slides freely within the channel 166B. The rear bumper 114 may be simply slid onto the slides 112A and 112B by positioning the rail 140A inside the opening 168A of the channel 166A and positioning the rail 140B inside the opening 168B of the channel 166B. Then, the rear bumper 114 may be pushed forwardly causing the channels 166A and 166B to slide along the rails 140A and 140B, respectively.

Referring to FIG. 4, the first slide member 156A includes a plurality of through-holes 170A and 172A, each configured to be aligned with the through-hole 134A formed in the slide 112A. Similarly, the second slide member 156B includes a plurality of through-holes 170B and 172B, each configured to be aligned with the through-hole 134B formed in the slide 112B. By way of non-limiting examples, the through-holes 170A and 172A may be spaced apart from one another by about 12 inches. Likewise, the through-holes 170B and 172B may be spaced apart from one another by about 12 inches. Each of the through-holes 170A and 172A is aligned with a corresponding one of the through-holes 170B and 172B across the lift apparatus 100. Each aligned pair determines a position of the rear bumper 114 with respect to the snowmobile 102 (see FIGS. 1 and 6-8). The example illustrated includes first and second pairs of aligned through-holes that allow the rear bumper 114 to be positioned in a first riding position (see FIGS. 1, 2, and 5) and a second deployed position (see FIGS. 3 and 6-8), respectively.

The first pair includes the through-holes 170A and 170B, which are aligned with one another across the lift apparatus 100 and are configured to receive the locating pins 116A and 116B, respectively. When the through-hole 170A is aligned with the through-hole 134A, the locating pin 116A may be inserted through both of the through-holes 170A and 134A. Similarly, when the through-hole 170B is aligned with the through-hole 134B, the locating pin 116B may be inserted through both of the through-holes 1706 and 1346. When the locating pins 116A and 116B are in the first pair of aligned through-holes 170A and 1706, respectively, the locating pins 116A and 116B lock the rear bumper 114 in the first riding position (see FIGS. 1, 2, and 5).

The second pair includes the through-holes 172A and 172B, which are aligned with one another across the lift apparatus 100 and configured to receive the locating pins 116A and 116B, respectively. When the through-hole 172A is aligned with the through-hole 134A, the locating pin 116A may be inserted through both of the through-holes 172A and 134A. Similarly, when the through-hole 172B is aligned with the through-hole 134B, the locating pin 116B may be inserted through both of the through-holes 1726 and 1346. When the locating pins 116A and 116B are in the second pair of aligned through-holes 172A and 1726, respectively, the locating pins 116A and 116B lock the rear bumper 114 in the second deployed position (see FIGS. 3 and 6-8).

Referring to FIG. 5, in the embodiment illustrated, the locating pins 116A and 116B have each been implemented as a push button quick release pin that includes a head 180, a push button 182, and a cylindrical or tubular body 184. The push button 182 is positioned on the head 180. The tubular body 184 includes retaining detents 186 and 188 that are biased outwardly beyond the tubular body 184. The detents 186 and 188 move inwardly into the tubular body 184 when a user 190 (see FIGS. 6-8) actuates (e.g., presses on) the push button 182. Thus, the user 190 (see FIGS. 6-8) may actuate (e.g., press on) the push button 182 and insert the locating pin 116A through the through-holes 170A and 134A when the rear bumper 114 in the first riding position (see FIGS. 1, 2, and 5) or through the through-holes 172A and 134A when the rear bumper 114 in the second deployed position (see FIGS. 3 and 6-8). Similarly, the user 190 (see FIGS. 6-8) may actuate (e.g., press on) the push button 182 and insert the locating pin 116B through the through-holes 170B and 134B when the rear bumper 114 in the first riding position (see FIGS. 1, 2, and 5) or through the through-holes 1726 and 1346 when the rear bumper 114 in the second deployed position (see FIGS. 3 and 6-8). The user 190 (see FIGS. 6-8) may also remove the locating pins 116A and 116B by actuating the push buttons 182 and pulling the tubular bodies 184 of the locating pins 116A and 116B free from the rest of the lift apparatus 100.

Optionally, the head 180 may include a retaining ring 192 or similar structure configured to be connected to a cord, chain, and the like that is connected to the snowmobile 102 (see FIGS. 1 and 6-8) and/or the lift apparatus 100 to help prevent the locating pins 116A and 116B from being lost.

Referring to FIG. 1, the rear bumper 114 is configured to be positioned in the first riding position when the user 190 (see FIGS. 6-8) is riding the snowmobile 102. In other words, the rear bumper 114 may be in the first riding position during normal riding conditions. Referring to FIG. 4, in the first riding position (see FIGS. 1, 2, and 5), the through-holes 170A and 134A are aligned with one another and the through-hole 1706 and 1346 are aligned with one another. The locating pin 116A is inserted through the aligned through-holes 170A and 134A and the locating pin 1166 is inserted through the aligned through-holes 1706 and 1346. Thus, the locating pins 116A and 116B maintain the rear bumper 114 in the first riding position with respect to the slides 112A and 112B, respectively.

Figure 6:
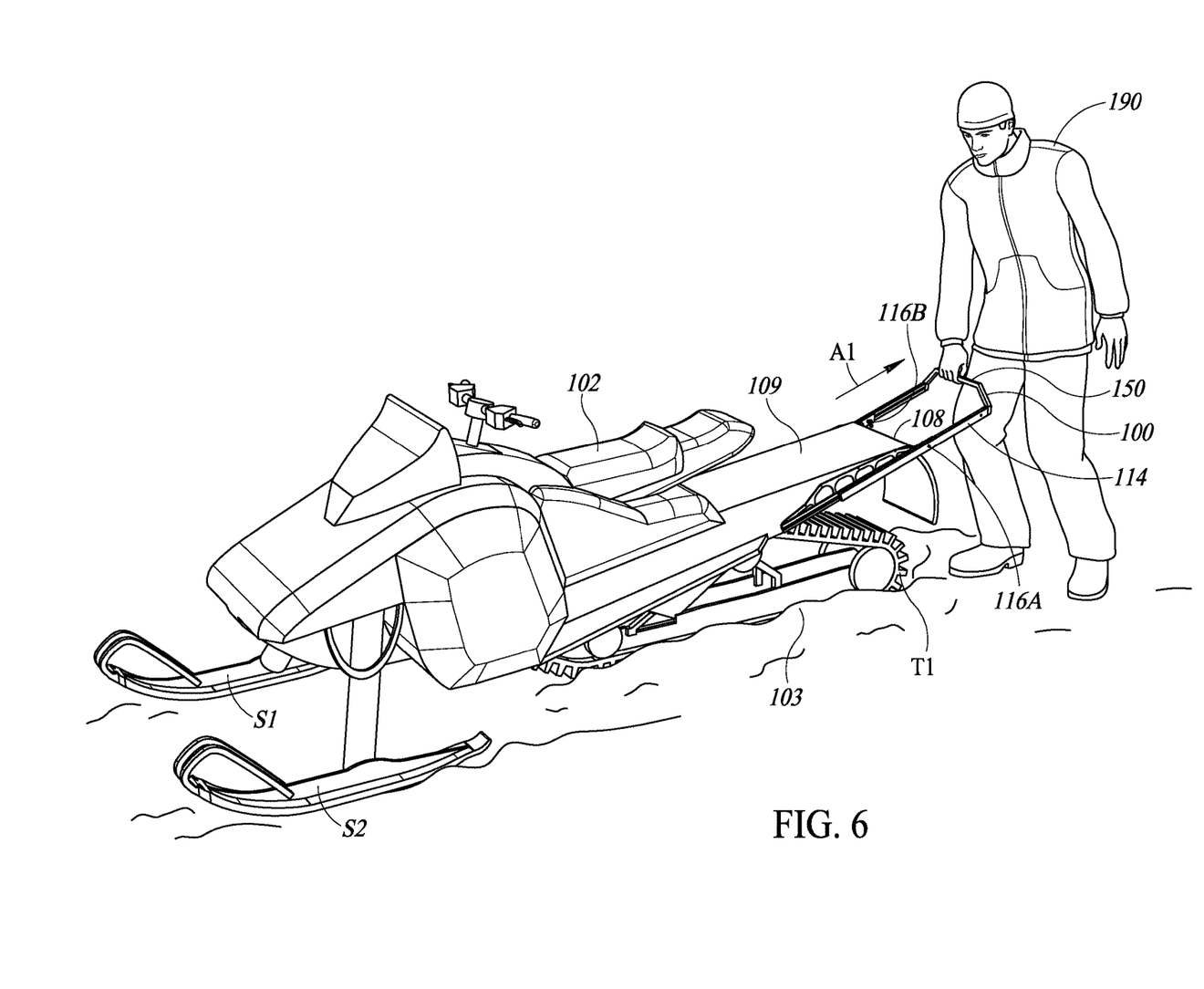
FIG. 6 is a perspective view of the snowmobile after a user has locked the rear bumper in the second deployed position.

Referring to FIG. 6, when the user 190 wishes to lift the rear portion 108 of the snowmobile 102 (e.g., the snowmobile 102 has become stuck in the snow 103), the user 190 may transition the rear bumper 114 from the first riding position (see FIGS. 1, 2, and 5) to the second deployed position (see FIGS. 3 and 6-8). First, the user 190 may remove the locating pin 116A from the through-holes 170A and 134A (see FIG. 4) and the locating pin 1166 from the through-holes 170B and 134B (see FIG. 4). Then, the user 190 may grip the bumper portion 150 and pull rearwardly on the bumper portion 150 (along the first deployment direction identified by the arrow A1) to slide the rear bumper 114 rearwardly until the through-holes 172A and 134A (see FIG. 4) are aligned with one another and the through-holes 1726 and 1346 (see FIG. 4) are aligned with one another. Then, the user 190 may lock the rear bumper 114 in the second deployed position by inserting the locating pin 116A in the aligned through-holes 172A and 134A and the locating pin 116B in the aligned through-holes 1726 and 134B.

Positioning the rear bumper 114 in the second deployed position increases a distance between the bumper portion 150 and the rear portion 108 of the snowmobile 102. Thus, the user 190 increases a distance from the bumper portion 150, where the lifting force is applied, and a pivot point (or fulcrum) of the snowmobile 102. The skis S1 and S2 may be the pivot point. In this manner, the user 190 increases leverage applied by the rear bumper 114 to the snowmobile 102.

Figure 7:
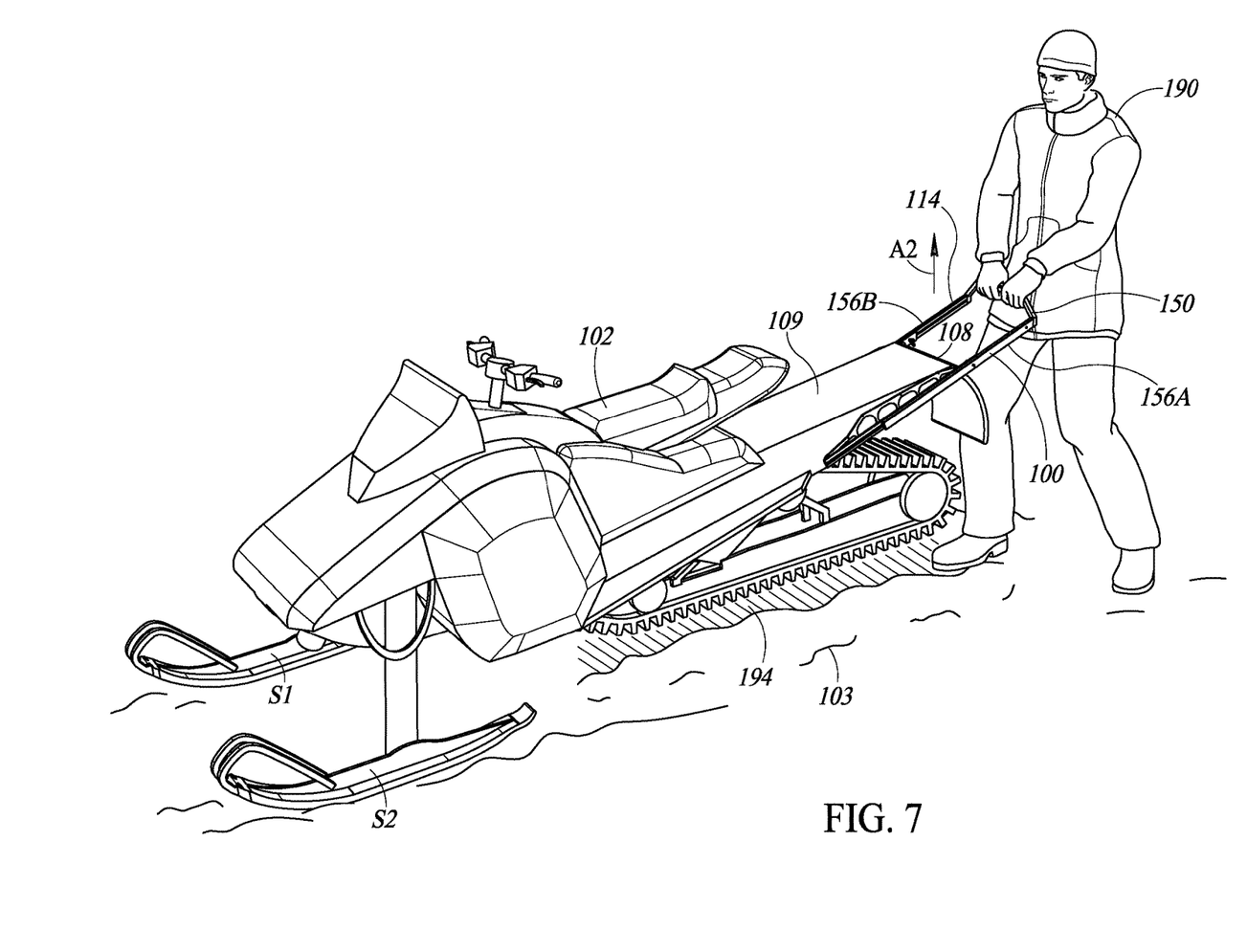
FIG. 7 is a perspective view of the user lifting the rear bumper and a rear portion of the snowmobile when the rear bumper is in the second deployed position.

Next, referring to FIG. 7, the user 190 may grip the bumper portion 150 and lift upwardly on the bumper portion 150 (e.g., in a lifting direction identified by an arrow A2) to lift the rear portion 108 of the snowmobile 102. This lifts the tracks T1 with less force than would be required to lift the tracks on a snowmobile with a conventional rear bumper.

Optionally, one or more additional people may assist the user 190 when lifting the rear portion 108 of the snowmobile 102. When in the second deployed position, the rear bumper 114 provides more locations whereat the additional people may grip the rear bumper 114 than a conventional rear bumper. In other words, when deployed, the rear bumper 114 is longer than a conventional rear bumper and may provide enough room for up to three people to lift the rear bumper 114; a first person may lift the first slide member 156A, a second person may lift the second slide member 156B, and a third person (e.g., the user 190) may lift the bumper portion 150.

Figure 8:
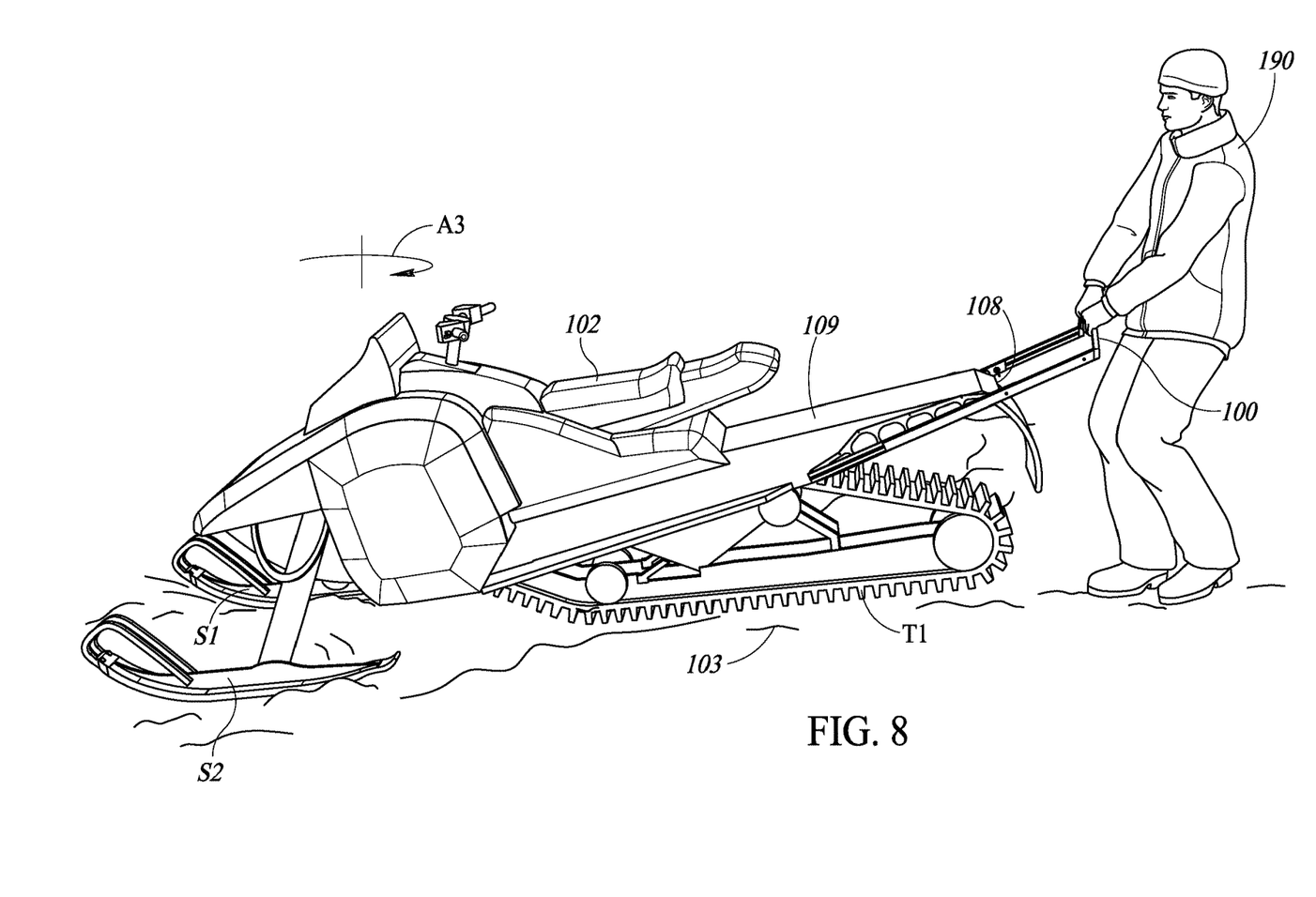
FIG. 8 is a perspective view of the user shifting the rear portion of the snowmobile laterally while the user lifts the rear bumper and the rear portion of the snowmobile.

Referring to FIG. 8, while the rear portion 108 of the snowmobile 102 is lifted, the user 190 and/or the one or more additional people may shift the rear portion 108 laterally (e.g., to position the tracks T1 outside a trench 194 illustrated in FIG. 7 that was formed by the tracks T1). Referring to FIG. 8, by way of a non-limiting example, the user 190 and/or the one or more additional people may rotate the snowmobile 102 in a counter-clockwise direction (identified by a curved arrow A3) and/or in a clockwise direction opposite the counter-clockwise direction. Then, the user 190 may lower the rear portion 108 of the snowmobile 102 into a desired position (e.g., where the tracks T1 are outside the trench 194 illustrated in FIG. 7). Thus, the tracks T1 may be moved from an undesired position (e.g., in the trench 194 illustrated in FIG. 7) to the desired position (e.g., outside the trench 194).

Referring to FIG. 6, when the user 190 wishes to transition the rear bumper 114 from the second deployed position (see FIGS. 3 and 6-8) to the first riding position (see FIGS. 1, 2, and 5), the user 190 removes the locating pin 116A from the through-holes 172A and 134A (see FIG. 4) and the locating pin 1166 from the through-holes 1726 and 1346 (see FIG. 4). Then, the user 190 may slide the rear bumper 114 forwardly (along the second riding direction that is opposite the first deployment direction identified by the arrow A1) until the through-holes 170A and 134A (see FIG. 4) are aligned with one another and the through-holes 1706 and 1346 (see FIG. 4) are aligned with one another. Then, the user 190 may lock the rear bumper 114 in the first riding position (see FIGS. 1, 2, and 5) by inserting the locating pin 116A in the aligned through-holes 170A and 134A (see FIG. 4) and the locating pin 1166 in the aligned through-holes 1706 and 1346 (see FIG. 4). Next, the user 190 may ride the snowmobile 102, if desired.

The slides 112A and 112B and a rear bumper 114 may be packaged together into a kit. Optionally, the kit may include the tunnel stiffeners 110A and 110B and/or the locating pins 116A and 116B. Optionally, the kit may include the plurality of fasteners 120.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A lift apparatus for a snowmobile comprising a tunnel, the lift apparatus comprising:
   a first tunnel stiffener configured to be attached to the tunnel and to help stiffen the tunnel;
   a first slide extending along the first tunnel stiffener;
   a second tunnel stiffener configured to be attached to the tunnel and to help stiffen the tunnel;
   a second slide extending along the second tunnel stiffener; and
   a rear bumper comprising a transverse bumper portion connected to first and second slide members, the first and second slide members being slidable along the first and second slides, respectively, to position the transverse bumper portion in a riding position or a deployed position, the transverse bumper portion being positioned farther from the snowmobile when the transverse bumper portion is in the deployed position than when the transverse bumper portion is in the riding position, the transverse bumper portion being configured to be gripped and lifted by a user when the transverse bumper portion is in the deployed position, the rear bumper being configured to lift a rear portion of the snowmobile when the transverse bumper portion is lifted.

2. The lift apparatus of claim 1, wherein the first and second slides each comprise a rear through-hole,
   the first and second slide members each comprise a rear through-hole,
   the rear through-hole of the first slide member is aligned with the rear through-hole of the first slide to define a first pair of aligned through-holes when the transverse bumper portion is in the riding position,
   the rear through-hole of the second slide member is aligned with the rear through-hole of the second slide to define a second pair of aligned through-holes when the transverse bumper portion is in the riding position, and
   the lift apparatus further comprises first and second locating pins configured to be inserted into the first and second pairs of aligned through-holes, respectively, to lock the transverse bumper portion in the riding position.

3. The lift apparatus of claim 2, wherein the first and second slide members each comprise a forward through-hole,
   the forward through-hole of the first slide member is aligned with the rear through-hole of the first slide to define a third pair of aligned through-holes when the transverse bumper portion is in the deployed position,
   the forward through-hole of the second slide member is aligned with the rear through-hole of the second slide to define a fourth pair of aligned through-holes when the transverse bumper portion is in the deployed position, and
   the first and second locating pins are configured to be inserted into the third and fourth pairs of aligned through-holes, respectively, to lock the transverse bumper portion in the deployed position.

4. The lift apparatus of claim 1, wherein the first tunnel stiffener has a first outwardly facing side opposite a first inwardly facing side,
   the first inwardly facing side is attached to the tunnel,
   the first slide is attached to the first outwardly facing side of the first tunnel stiffener,
   the second tunnel stiffener has a second outwardly facing side opposite a second inwardly facing side,
   the second inwardly facing side is attached to the tunnel, and
   the second slide is attached to the second outwardly facing side of the second tunnel stiffener.

5. The lift apparatus of claim 1, wherein the first and second slides comprise first and second rails, respectively,
   the first slide member comprises a first channel configured to receive the first rail and to slide therealong, and
   the second slide member comprises a second channel configured to receive the second rail and to slide therealong.

6. The lift apparatus of claim 1, wherein the first slide member is configured to allow a first person to grip the first slide member and lift upwardly on the first slide member when the transverse bumper portion is in the deployed position, and
   the second slide member is configured to allow a second person to grip the second slide member and lift upwardly on the second slide member when the transverse bumper portion is in the deployed position.

7. A kit for constructing a lift apparatus for a snowmobile comprising a tunnel, the kit comprising:
   first and second tunnel stiffeners configured to be attached to the tunnel and to help stiffen the tunnel;
   first and second slides extending along the first and second tunnel stiffeners, respectively; and
   a rear bumper positionable along the first and second slides in a riding position and a deployed position, the rear bumper comprising a transverse bumper portion, a first slide member, and a second slide member, the first and second slide members being slidable along the first and second slides, respectively, to position the rear bumper in a selected one of the riding position and the deployed position, the transverse bumper portion being configured to be gripped and lifted by a user when the rear bumper is in the deployed position, the rear bumper being configured to lift a rear portion of the snowmobile when the first and second slides are attached to the snowmobile and the transverse bumper portion is lifted.

8. The kit of claim 7, wherein the first and second slides each comprise a rear through-hole,
   the first and second slide members each comprise a rear through-hole,
   the rear through-hole of the first slide member is aligned with the rear through-hole of the first slide to define a first pair of aligned through-holes when the rear bumper is in the riding position,
   the rear through-hole of the second slide member is aligned with the rear through-hole of the second slide to define a second pair of aligned through-holes when the rear bumper is in the riding position, and
   the kit further comprises first and second locating pins configured to be inserted into the first and second pairs of aligned through-holes, respectively, to lock the rear bumper in the riding position.

9. The kit of claim 8, wherein the first and second slide members each comprise a forward through-hole,
   the forward through-hole of the first slide member is aligned with the rear through-hole of the first slide to define a third pair of aligned through-holes when the rear bumper is in the deployed position,
   the forward through-hole of the second slide member is aligned with the rear through-hole of the second slide to define a fourth pair of aligned through-holes when the rear bumper is in the deployed position, and the first and second locating pins are configured to be inserted into the third and fourth pairs of aligned through-holes, respectively, to lock the rear bumper in the deployed position.

10. The kit of claim 7, wherein the first tunnel stiffener has a first outwardly facing side opposite a first inwardly facing side, the first inwardly facing side is attachable to the tunnel, the first slide is attachable to the first outwardly facing side of the first tunnel stiffener, the second tunnel stiffener has a second outwardly facing side opposite a second inwardly facing side, the second inwardly facing side is attachable to the tunnel, and the second slide is attachable to the second outwardly facing side of the second tunnel stiffener.

11. The kit of claim 7, wherein the first slide is attached to a first outwardly facing side of the first tunnel stiffener, and the second slide is attached to a second outwardly facing side of the second tunnel stiffener.

12. The kit of claim 7, wherein the first and second slides comprise first and second rails, respectively, the first slide member comprises a first channel configured to receive the first rail and to slide therealong, and the second slide member comprises a second channel configured to receive the second rail and to slide therealong.

13. A snowmobile comprising:

a rear portion;

a tunnel positioned in the rear portion, the tunnel having first and second sides; and a bumper attached to the tunnel and configured to slide with respect the tunnel between a riding position and a deployed position, the snowmobile being ridable when the bumper is in the riding position, the rear portion being liftable by the bumper when the bumper is in the deployed position, the bumper comprising first and second tunnel stiffeners, first and second slides, and first and second slide members, the first tunnel stiffener being configured to be attached to the first side of the tunnel to help stiffen the tunnel, the first slide being attachable to the first tunnel stiffener and mounted to the first side of the tunnel by the first tunnel stiffener, the second tunnel stiffener being configured to be attached to the second side of the tunnel to help stiffen the tunnel, the second slide being attachable to the second tunnel stiffener and mounted to the second side of the tunnel by the second tunnel stiffener, the first and second slide members being configured to slidably engage the first and second slides, respectively.

14. The snowmobile of claim 13, wherein the first and second slides each comprise a rear through-hole, the first and second slide members each comprise a rear through-hole, the rear through-hole of the first slide member is aligned with the rear through-hole of the first slide to define a first pair of aligned through-holes when the bumper is in the riding position, the rear through-hole of the second slide member is aligned with the rear through-hole of the second slide to define a second pair of aligned through-holes when the bumper is in the riding position, and the bumper further comprises first and second locating pins configured to be inserted into the first and second pairs of aligned through-holes, respectively, to lock the bumper in the riding position.

15. The snowmobile of claim 14, wherein the first and second slide members each comprise a forward through-hole, the forward through-hole of the first slide member is aligned with the rear through-hole of the first slide to define a third pair of aligned through-holes when the bumper is in the deployed position, the forward through-hole of the second slide member is aligned with the rear through-hole of the second slide to define a fourth pair of aligned through-holes when the bumper is in the deployed position, and the first and second locating pins are configured to be inserted into the third and fourth pairs of aligned through-holes, respectively, to lock the bumper in the deployed position.

16. The snowmobile of claim 13, wherein the first and second slides comprise first and second rails, respectively, the first slide member comprises a first channel configured to receive the first rail and to slide therealong, and the second slide member comprises a second channel configured to receive the second rail and to slide therealong.

17. The snowmobile of claim 13, wherein the first slide member is configured to allow a first person to grip the first slide member and lift upwardly on the first slide member when the bumper is in the deployed position, and the second slide member is configured to allow a second person to grip the second slide member and lift upwardly on the second slide member when the bumper is in the deployed position.

18. The snowmobile of claim 17, wherein the bumper comprises a transverse member extending between the first and second slide members, and the transverse member is configured to allow a third person to grip the transverse member and lift upwardly on the transverse member when the bumper is in the deployed position.

19. A snowmobile comprising:

a rear portion;

a tunnel positioned in the rear portion, the tunnel having first and second sides; and a bumper attached to the tunnel and configured to slide with respect the tunnel between a riding position and a deployed position, the snowmobile being ridable when the bumper is in the riding position, the rear portion being liftable by the bumper when the bumper is in the deployed position, the bumper comprising first and second slides and first and second slide members, the first and second slides being mounted to first and second sides, respectively, of the tunnel, the first and second slide members being configured to slidably engage the first and second slides, respectively, the first and second slides comprising first and second rails, respectively, the first slide member comprising a first channel configured to receive the first rail and to slide therealong, and the second slide member comprising a second channel configured to receive the second rail and to slide therealong.

20. The snowmobile of claim 19, wherein the first and second slides each comprise a rear through-hole, the first and second slide members each comprise a rear through-hole, the rear through-hole of the first slide member is aligned with the rear through-hole of the first slide to define a first pair of aligned through-holes when the bumper is in the riding position, the rear through-hole of the second slide member is aligned with the rear through-hole of the second slide to define a second pair of aligned through-holes when the bumper is in the riding position, and the bumper further comprises first and second locating pins configured to be inserted into the first and second pairs of aligned through-holes, respectively, to lock the bumper in the riding position.

21. The snowmobile of claim 20, wherein the first and second slide members each comprise a forward through-hole, the forward through-hole of the first slide member is aligned with the rear through-hole of the first slide to define a third pair of aligned through-holes when the bumper is in the deployed position, the forward through-hole of the second slide member is aligned with the rear through-hole of the second slide to define a fourth pair of aligned through-holes when the bumper is in the deployed position, and the first and second locating pins are configured to be inserted into the third and fourth pairs of aligned through-holes, respectively, to lock the bumper in the deployed position.

22. The snowmobile of claim 19, wherein the first slide member is configured to allow a first person to grip the first slide member and lift upwardly on the first slide member when the bumper is in the deployed position, and the second slide member is configured to allow a second person to grip the second slide member and lift upwardly on the second slide member when the bumper is in the deployed position.

23. The snowmobile of claim 22, wherein the bumper comprises a transverse member extending between the first and second slide members, and the transverse member is configured to allow a third person to grip the transverse member and lift upwardly on the transverse member when the bumper is in the deployed position.

* * * * *